United States Patent Office 3,437,710
Patented Apr. 8, 1969

3,437,710
TRANSALKYLATION PROCESS
Ernest L. Pollitzer, Hinsdale, Ill., assignor to Universal Oil Products Company, Des Plaines, Ill., a corporation of Delaware
No Drawing. Continuation-in-part of application Ser. No. 560,786, June 27, 1966. This application Dec. 26, 1967, Ser. No. 693,071
Int. Cl. C07c 3/52, 3/58, 3/62
U.S. Cl. 260—672    6 Claims

ABSTRACT OF THE DISCLOSURE

A mixture of a $C_9$ aromatic hydrocarbon and toluene is transalkylated utilizing a catalyst comprising a crystalline aluminosilicate suspended in a refractory inorganic oxide matrix and having at least one active catalytic ingredient carried by the matrix.

CROSS-REFERENCE TO RELATED APPLICATIONS

This application is a continuation-in-part of my copending application Ser. No. 560,786, filed June 27, 1966.

DESCRIPTION OF THE INVENTION

This invention relates to a conversion process for the transalkylation of a mixture of a $C_9$ aromatic hydrocarbon and toluene into more useful compounds. More specifically, this invention is concerned with a conversion process for the transalkylation of a mixture of a $C_9$ aromatic hydrocarbon and toluene utilizing a novel catalyst comprising a finely divided crystalline aluminosilicate suspended in a refractory inorganic oxide matrix and having at least one active catalytic ingredient carried by the matrix.

It is therefore an object of this invention to provide a process for the transalkylation of a mixture of a $C_9$ aromatic hydrocarbon and toluene utilizing a novel transalkylation catalyst.

A specific object of this invention is to provide a novel method and novel catalysts for transalkylating a mixture of a $C_9$ aromatic hydrocarbon and toluene to provide the desired xylenes in high yields.

One embodiment of this invention relates to a process for the transalkylation of a mixture of a $C_9$ aromatic hydrocarbon and toluene which comprises contacting said mixture at transalkylation conditions including a temperature in the range of from 400° to about 520°, a pressure in the range of from about atmospheric to about 100 atmospheres, a hydrogen to hydrocarbon mol ratio of from about 2:1 to about 20:1 and from about 0.001 weight percent to about 2.0 weight percent sulfur and from about 0.001 weight percent to about 2.0 weight percent chloride with a catalyst comprising a finely divided crystalline aluminosilicate suspended in a refractory inorganic oxide matrix and having at least one active catalytic ingredient carried by the matrix.

Other objects and embodiments referring to alternative catalytic compositions of matter will be found in the following further detailed description of the invention.

I have now found that a mixture of a $C_9$ aromatic hydrocarbon and toluene may be converted to the xylenes in high yields by contacting said mixture at specific operating conditions with certain catalytic compositions of matter which are prepared by specific methods.

The preferred $C_9$ aromatic hydrocarbons for use in my invention include 1,2,3-trimethylbenzene, 1,2,4-trimethylbenzene, 1,3,5 - trimethylbenzene, and mixtures thereof, and n-propylbenzene, isopropylbenzene, 1-methyl-2-ethylbenzene, 1-methyl-3-ethylbenzene, 1-methyl-4-ethylbenzene and mixtures thereof may also be utilized although not necessarily with equivalent results.

The novel catalyst employed in my invention consists essentially of a support comprising a finely divided crystalline aluminosilicate suspended in a refractory inorganic oxide matrix such as alumina, silica or silica-alumina, and at least one catalytic ingredient composited on said support. The crystalline aluminosilicates are composed of $SiO_4$ and $AlO_4$ tetrahedra, a silicon or aluminum atom being centered around 4 oxygen atoms in the tetrahedra and the oxygens being shared with other surrounding tetrahedra. These aluminosilicates are geometrically arranged to form a pore structure having sufficiently large pore mouths to permit the reactant molecule to pass into said pore structure. Preferably, the aluminosilicates employed in the catalyst support have pore mouths of from about 5 up to about 15 Angstroms in cross-sectional diameter. The aluminosilicates are treated to improve their catalytic activity by techniques such as ion-exchange with suitable cations and thermal treatment and by treatment with acids such as hydrofluoric acid. Ordinarily, the aluminosilicates are synthetically prepared in the alkali metal form (usually sodium) and there is one monovalent alkali metal cation associated with these aluminum centered tetrahedra (to maintain electrical neutrality). The aluminosilicates may be ion exchanged with polyvalent cations such as calcium, magnesium, beryllium, and the rare earths, etc. to replace a substantial amount of the monovalent cation. This causes one polyvalent cation to be associated with more than one aluminum centered tetrahedra and if these tetrahedra are spread sufficiently far apart (due to the presence of silicon centered tetrahedra) areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline alumiosilicates to the hydrogen form.

There are numerous types of crystalline aluminosilicates, both synthetic and natural occurring, it is preferable that the pore mouths of the crystalline aluminosilicates have a cross-sectional diameter of from about 5 to about 15 Angstrom units. Among the preferable crystalline aluminosilicates that are suitable are the hydrogen and/or polyvalent forms of faujasite and mordenite.

The concentration of crystalline aluminosilicates in the refractory oxide matrix and preferably in the alumina matrix is usually less than about 20 weight percent of the alumina although in some cases greater concentrations may also be suitable. Concentrations of aluminosilicates of about 10 weight percent or less are especially preferred. The concentration of Group VIII metal depends to a large extent on the metal. When employing noble metals such as platinum, or palladium, the concentration on the catalyst is preferably from about 0.05 to about 5.0 weight percent.

Rare earth metals utilizable within the scope of this invention include cerium, lanthanum, praseodymium, neodymium, illinium, samarium, europium, gadolinium, terbium, dysprosium, holmium, erbium, thulium, scandium, yttrium, and lutecium and mixtures thereof. A wide variety of rare earth compounds can be employed as a source of rare earth metal ions. Suitable compounds include rare earth chloride, bromides, iodides, sulfates, acetates, benzoates, citrates, nitrates, and the like. The preferred rare earth salts are the chlorides, nitrates, and sulfates. The rare earth metal salts employed can either be the salt of a single rare earth metal, or is usually the case, mixtures of rare earth metals such as rare earth metal chlorides. Thus, the catalyst may comprise rare earth cations chemisorbed or ionically bonded to the crystalline aluminosilicate, although at least a portion of said cations may be sorbed or bonded to the amorphous component of the catalyst composite. It is also contemplated within the scope of this invention that platinum and/or palladium may also be utilized in conjunction with rare earth metals in the process of this invention.

The process of this invention utilizing the catalyst hereinbefore set forth may be effected in any suitable manner and may comprise either a batch or a continuous type of operation. The preferred method by which the process of this invention may be effected is a continuous type operation. One particular method is the fixed bed operation in which the mixture of a $C_9$ aromatic hydrocarbon and toluene is continuously charged to a reaction zone containing a fixed bed of the desired catalyst, said zone being maintained at the proper operating conditions of temperature and pressure, that is, a temperature in the range of from about 400° to about 520° C. or more, and preferably from about 425° to about 515° C., a pressure of from about atmospheric to about 100 atmospheres or more, and a hydrogen to hydrocarbon mol ratio of from about 2:1 to about 20:1. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with a adsorbent packing material. The charge passes through the catalyst bed in either an upward or downward or radial flow and the transalkylation product is continuously withdrawn, separated from the reactor effluent and recovered, while any unreacted starting material may be recycled to form a portion of the feed stock.

It is also contemplated within the scope of this invention that certain feed additives in an amount of from about 0.001 weight percent to about 2.0 weight percent of the total feed mixture may be added to the transalkylation zone by, for example, commingling said feed additive with the hydrocarbon charge stock passing thereto, or by adding the feed additive simultaneously with, but independently of said hydrocarbon charge. However, the particular catalyst utilized as well as the particular transalkylation conditions will dictate whether a feed additive is desired and the amount that is necessary for efficient operation of my transalkylation process. Feed additives that are utilizable in my process are those providing chloride and/or sulfur. Those additives providing sulfur include sulfur, hydrogen sulfide, primary, secondary and tertiary alkane and cycloalkane thiols, and the alkane sulfides and disulfides.

Another continuous type operation comprises the moving bed type in which the mixture of $C_9$ aromatic hydrocarbon and toluene and the catalyst bed move either concurrently or countercurrently to each other while passing through said reaction zone. Another type operation which may be used in the batch type operation in which a quantity of the mixture of $C_9$ aromatic hydrocarbon and toluene and the catalyst are placed in an appropriate apparatus, such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention and are introduced for the purpose of illustration only with no intention of unduly limiting the generally broad scope of my invention.

Example I

A catalyst comprising 10% hydrogen form mordenite and 0.75 weight percent platinum was placed in a transalkylation zone. A mixture of $C_9$ aromatic hydrocarbon and toluene, specifically 37.8 weight percent 1,2,4-trimethylbenzene and 61.9 weight percent toluene, along with 600 p.p.m. sulfur and 50 p.p.m. chloride was continuously charged to said reaction zone at conditions including a temperature of 460° C., a pressure of 300 p.s.i.g., a hydrogen to hydrocarbon mol ratio of 8:1 and a LHSV of 2.0.

The total $C_8$ make was 21.9 weight percent. The total $C_9$'s remaining were 23.1 weight percent. The toluene concentration decreased to 41.7 weight percent. The composition of the $C_8$ product, in weight percent, was para- and meta-xylene, 15.5; ortho-xylene, 4.4%; and a trace amount of ethylbenzene. Additional runs were made with the same catalyst at temperatures ranging from 460° C. to 520° C. At a temperature of 500° C., a pressure of 300 p.s.i.g., a hydrogen to hydrocarbon mol ratio of 8:1 and a LHSV of 1.0, total $C_8$ make was 17.6 weight percent. The total $C_9$'s remaining were 22.4 weight percent. Toluene concentration was 50.1 weight percent. The composition of the $C_8$ product, in weight percent, was para- and meta-xylene, 13.5%; ortho-xylene, 4.1%; and a trace amount of ethylbenzene. At a plant operating temperature of 510° C. and at 300 p.s.i.g., a hydrogen to hydrocarbon mol ratio of 8:1, a LHSV of 1.0, a total $C_8$ make of 14.4 was recorded. The total $C_9$'s remaining were 25.1 weight percent. Toluene concentration was 51.8 weight percent. The composition of the $C_8$ product in weight percent, was para- and meta-xylene 11.0%; ortho-xylene, 3.4%; and a trace amount of ethylbenzene.

The feed stock was then changed to a mixture of $C_9$ aromatic hydrocarbons and toluene, specially 57.4 weight percent 1,2,4-trimethylbenzene, 1.5 weight percent 1,3,5-trimethylbenzene, a trace amount of 1,2,3-trimethylbenzene, 0.4% styrene and light ends, and 40.7 weight percent toluene, and 600 p.p.m. of sulfur and 50 p.p.m. chloride was continuously charged to the reaction zone at conditions including a temperature of 510° C., a pressure of 300 p.s.i.g., a hydrogen to hydrocarbon mol ratio of 8:1 and a LHSV of 1.0. The total $C_8$ make was 15.6 weight percent. The $C_9$'s remaining were 35.6 weight percent. The toluene concentration was 40.5 weight percent. The composition of the $C_8$ product, in weight percent, was para- and meta-xylene, 12.0; ortho-xylene, 3.6%; and a trace amount of ethylbenzene.

The charge stock was again changed so that the composition, in weight percent, was as follows: 36.7% 1,2,4-trimethylbenzene, 1.5% 1,3,5-trimethylbenzene, 0.3% styrene, and 61.9% toluene. This charge stock along with 600 p.p.m. sulfur and 50 p.p.m. chloride was continuously charged to the reaction zone at conditions including a temperature of 520° C., a pressure of 300 p.s.i.g., a hydrogen to hydrocarbon mol ratio of 8:1 and a LHSV of 1.0. The total $C_8$ make was 15.3 weight percent. The total $C_9$'s remaining were 23.5 weight percent. The toluene concentration was 52.9 weight percent. The composition of the $C_8$ product, in weight percent, was para- and meta-xylene, 11.8%; ortho-xylene, 3.5%; and a trace amount of ethylbenzene.

Example II

A catalyst comprising 10% hydrogen form mordenite and 0.64 weight percent platinum was placed in the transalkylation reaction zone. A mixture of $C_9$ aromatic hydrocarbon and toluene, specifically 9.7 weight percent 1,2,4-trimethylbenzene, 0.3% 1,3,5-trimethylbenzene, 0.1% styrene and light ends and 89.9 weight percent toluene, along with the 600 p.p.m. sulfur and 50 p.p.m. chloride was continuously charged to said reaction zone at conditions including a temperature of 460° C., a pressure of 300 p.s.i.g., a hydrogen to hydrocarbon mol ratio of 8:1 and a liquid hourly space velocity of 2.0. At these conditions, the total C₈ make was 9.8 weight percent. The composition of the C₈ product, in weight percent, was para- and meta-xylene, 7.6%; ortho-xylene 2.2%; and a trace amount of ethylbenzene. The total C₉'s remaining were 7.9 weight percent. The toluene concentration was 68.2 weight percent. The operating conditions were changed so that the plant was operated at a temperature of 500° C., a pressure of 300 p.s.i.g., a hydrogen to hydrocarbon mol ratio of 8:1 and a LHSV of 1.0. The total C₈ make at these conditions was 11.5 weight percent of which 8.9% was para- and meta-xylene and 2.6% was ortho-xylene. A trace amount of ethylbenzene was also recorded. The total C₉'s remaining were 5.8 percent. Toluene concentration was 67.8 weight percent.

Operating conditions were again changed so that the plant pressure was raised from 300 p.s.i.g. to 500 p.s.i.g. At these conditions, a total C₈ make of 12.2 weight percent was recorded. The composition of this C₈ product in weight percent, was para- and meta-xylene, 9.5%; ortho-xylene, 2.7%; and a trace amount of ethylbenzene. The total C₉'s remaining were 4.0 weight percent. Toluene concentration was 53.8 weight percent. Next, plant pressure was raised to 800 p.s.i.g. while the operating temperature was lowered to 460° C. At these conditions, a C₈ make of 8.3 weight percent was achieved. The composition of this C₈ product, in weight percent, was para- and meta-xylene, 6.5%; ortho-xylene, 1.8; and a trace amount of ethylbenzene. The total C₉'s remaining were 3.7 weight percent. The toluene concentration was 33.3 weight percent.

The plant temperature was again raised to 500° C. and the plant was kept at the 800 p.s.i.g. level. The total C₈ make at these conditions was 14.1 weight percent of which 11.0% was para-and meta-xylene, and 3.1% was ortho-xylene.

Example III

A catalyst comprising a rare earth platinum-containing high silica faujasite, specifically a catalyst comprising 9 weight percent ion exchanged rare earths (specifically, 2.5 weight percent lanthanum, 4.4 weight percent cerium, 0.6 weight percent praseodymium, 1.4 weight percent neodymium and trace amounts of samarium, europium and gadolinium) and 0.49 weight percent platinum is placed in a transalkylation reaction zone. Toluene and 1,2,4-trimethylbenzene along with 600 p.p.m. sulfur are continuously charged to said reaction zone at conditions including a temperature of 450° C., 300 p.s.i.g., a hydrogen to hydrocarbon mol ratio of 8:1, and a LHSV of 2.0. A C₈ make of 15.2 weight percent is achieved.

The composition of this C₈ product, in weight percent, is para- and meta-xylene, 11.8%; ortho-xylene, 3.4%; and a trace amount of ethylbenzene.

Example IV

A catalyst comprising magnesium cation exchanged high silica faujasite and 0.75 weight percent platinum is placed in the transalkylation zone. Toluene and 1,2,4-trimethylbenzene along with 600 p.p.m. sulfur are continuously charged to the reaction zone at conditions including a temperature of 450° C., 300 p.s.i.g., a hydrogen to hydrocarbon mol ratio of 8:1 and a LHSV of 1.0. A C₈ make of 12.3 weight percent is achieved. The composition of this C₈ product, in weight percent, is para- and meta-xylene, 9.9%; and ortho-xylene, 2.4%; and a trace amount of ethylbenzene.

I claim as my invention:

1. A process for the transalkylation of a mixture of a C₉ aromatic hydrocarbon and toluene which comprises contacting said mixture at transalkylation conditions including a temperature in the range of from about 400° to about 525° C., a pressure in the range of from about atmospheric to about 100 atmospheres, a hydrogen to hydrocarbon mol ratio of from about 2:1 to about 20:1, and from about 0.001 weight percent to about 2.0 weight percent sulfur and from about 0.001 weight percent to about 2.0 weight percent chloride with a catalyst comprising at least one active catalytic ingredient selected from the group consisting of a metal from Group VIII of the Periodic Table and the rare earth metals on a support comprising a finely divided crystalline aluminosilicate suspended in a refractory inorganic oxide matrix.

2. The process of claim 1 further characterized in that the crystalline aluminosilicate is in the hydrogen form, the refractory inorganic oxide matrix is alumina, and the active catalytic ingredient comprises a metal selected from Group VIII of the Periodic Table.

3. The process of claim 1 further characterized in that the crystalline aluminosilicate is in the hydrogen form and the active catalytic ingredient comprises at least one metal selected from the group consisting of platinum, palladium and the rare earth metals.

4. The process of claim 1 further characterized in that the crystalline aluminosilicate is a mordenite type and the active catalytic ingredient comprises at least one metal selected from the group consisting of platinum, palladium and the rare earth metals.

5. The process of claim 1 further characterized in that the crystalline aluminosilicate is a faujasite type and the active catalytic ingredient comprises at least one metal selected from the group consisting of platinum, palladium and the rare earth metals.

6. The process of claim 1 further characterized in that the crystalline aluminosilicate is faujasite containing magnesium cation composited with at least one metal selected from the group consisting of platinum, palladium and the rare earth metals.

References Cited

UNITED STATES PATENTS

| 3,140,253 | 7/1964 | Plank et al. | 208—120 |
| 3,281,483 | 10/1966 | Benesi et al. | 260—672 |

DELBERT E. GANTZ, Primary Examiner.

G. E. SCHMITKONS, Assistant Examiner.